United States Patent [19]

Taylor

[11] Patent Number: 4,700,866
[45] Date of Patent: Oct. 20, 1987

[54] PRESSURE LOCKING FILLER CAP

[75] Inventor: Herbert Taylor, Bennington, Vt.

[73] Assignee: Bijur Lubricating Corp., Bennington, Vt.

[21] Appl. No.: 930,799

[22] Filed: Nov. 14, 1986

[51] Int. Cl.4 .............................................. B65D 45/00
[52] U.S. Cl. ...................................... 220/316; 220/284
[58] Field of Search ................................ 220/316, 284

[56] References Cited

U.S. PATENT DOCUMENTS

| | | | |
|---|---|---|---|
| 4,024,982 | 5/1977 | Schultz | 220/316 X |
| 4,122,969 | 10/1978 | Hughey | 220/256 |
| 4,251,007 | 2/1981 | Behnisch | 220/316 |
| 4,343,325 | 8/1982 | Fallon | 220/316 |
| 4,384,655 | 5/1983 | Kendall | 220/316 |
| 4,424,915 | 1/1984 | Horn | 220/316 |

Primary Examiner—George T. Hall
Attorney, Agent, or Firm—Ostrolenk, Faber, Gerb & Soffen

[57] ABSTRACT

A pressure locking cap for a pressurized vessel is screw threaded on its periphery for being screwed into a filling opening in the vessel. The top of the cap includes a socket for receiving a wrench for unscrewing the cap. A first piston in the cap communicates into the pressure of the vessel and the piston includes a piston rod which is moved into the socket to prevent insertion of the socket removal tool upon elevated pressure developing in the vessel. In an alternate embodiment, a second piston is placed inside the first piston and also communicates with the pressure of the vessel. A locking element, such as a ball, moves with the first piston through the cap body until the locking element moves even with a recess in the cap body. The second piston is movable, against spring resistance, by elevated pressure in the vessel and the piston is shaped with a tapered shoulder which drives the locking element outwardly into the recess in the cap body for locking the first piston in the upraised condition at which it blocks insertion of the tool into the socket.

18 Claims, 6 Drawing Figures

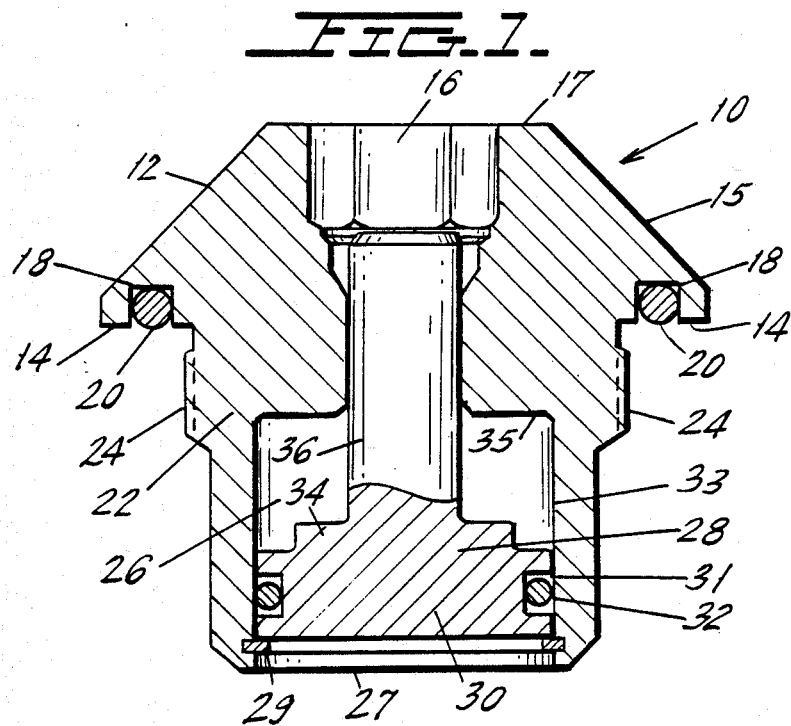
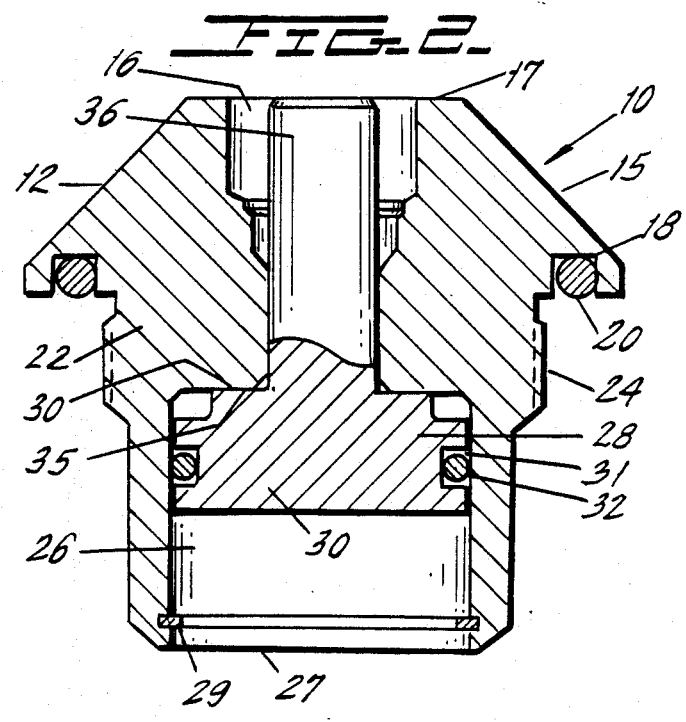

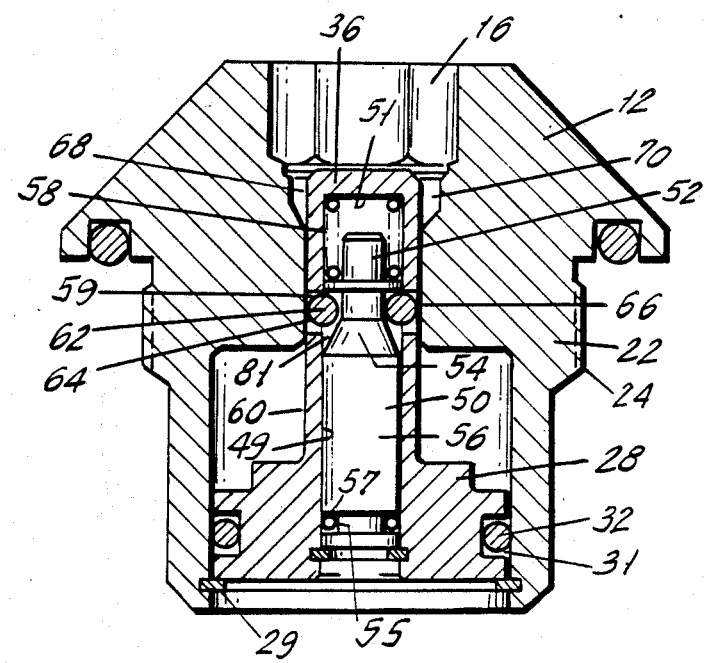
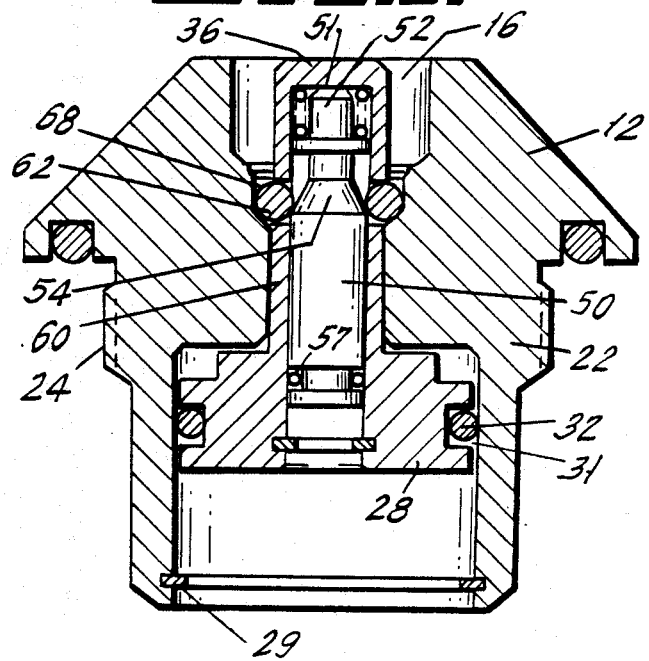

PRESSURE LOCKING FILLER CAP

BACKGROUND OF THE INVENTION

The present invention is related to a pressure locking filler cap for a vessel or container, and more particularly to a locking filler cap which interferes with an operator's ability to connect a turning tool to the cap under unsafe pressure conditions.

Locking filler caps are commonly provided over the openings in pressurized vessels or tanks through which such vessels can be refilled. It may be hazardous to open the filler cap while the vessel is still pressurized. As the filler cap is being removed, e.g. unscrewed, it could explode from the vessel upon final thread disengagement or permit explosive or too rapid exit of the contents of the vessel and cause injury to personnel and to property.

The prior approach to preventing opening of the filler cap before the internal pressure of its vessel is relieved was to either warn the operator of the high pressure condition or to interfere with the opening of the filler cap. Known warning schemes include prominently located labels on the vessel and on the filler cap, pressure gauges to indicate actual tank pressure near the filler cap, deliberate creation of a high thread engagement force for a screw cap under pressurized conditions so as to interfere with removal of the cap, and vent holes or the like for producing an air pressure induced audible response if the cap is loosened while the vessel is still pressurized.

Several U.S. patents disclose vessel caps with a mechanism that will interfere with unscrewing of the cap unless the internal pressure of the vessel is first relieved.

U.S. Pat. No. 1,858,013 to Heins discloses a cap which is retained in place by a threaded element 17 which may be turned by a handle 69. Under pressure, a rod 52 is pushed outwardly whereby, with the cooperation of a pin 48 and a member 45, cooperating screw teeth 22 and 74 are separated so that turning of the handle does not produce any turning of the threaded elements of the filler cap.

Dunton, U.S. Pat. No. 2,670,099, discloses a bolt-shaped cover wherein, as seen from FIGS. 7 and 8, an internal pressure communicates through an axially extending port 54 to act against a piston 62 to thereby disengage a turning rod 58 from a groove 90. In a disengaged position, rod 58 is uncoupled from the bolt and is not usable for turning or unscrewing the bolt until the pressure is relieved.

U.S. Pat. No. 1,706,051 to Auchincloss provides a piston that under pressure causes threads of a cover to lock to prevent the disengagement thereof.

Guiver, U.S. Pat. No. 3,122.263, discloses a pipe plug 1 having a stiff end anc a movable plunger 18. Pressure within the pipe moves the plunger outwardly to lock a bolt 12 in a groove in the pipe thereby preventing its removal by a grab mechanism that engages the internal flanges 27 on the outer end of the sleeve.

Wackman, U.S. Pat. No. 1,891,033, takes a different approach by providing a top cover 16 which is snap mounted onto the cap to cover a wrench receiving socket in the cap. The cap cover cannot be removed before the seal is broken.

SUMMARY OF THE INVENTION

The present invention provides an alternative to the prior art and reliably interferes with the insertion of an unscrewing tool into a key wrench type socket of the cap unless the internal pressure in the vessel has been relieved.

It is an object of the present invention to provide a pressure locking filler cap that operates reliably to prevent opening of the filler cap while the capped vessel is pressurized.

It is another object of the invention to provide such a filler cap which can be operated by an inserted removal tool which is received in the cap.

It is a further object of the invention to provide the cap of the type described above with a simple, reliable, and inexpensive removal prevention mechanism.

Yet another object of the invention is to provide such a cap which is screw connected to the vessel.

A still further object of the invention is to enable slightly difficult opening of the cap under lower pressure and to prevent cap opening under higher pressure.

It is still another object of the invention to provide a dual mode filler cap with both a defeatable interfering mechanism which discourages opening of the cap under low pressure conditions and a further undefeatable mechanism which prevents opening of the cap under higher pressure conditions.

The foregoing and other objects of the invention are realized with a pressure locking cap that includes a cap body with a top piece having a key wrench socket and a cylindrical, depending, externally threaded bottom piece which is suitable for being screwed into a correspondingly threaded opening in a vessel. A sliding piston in the bottom piece is exposed to the pressure in the vessel and is mounted in the cap body to be driven by the pressure into the socket. The sliding piston is sized and shaped to prevent insertion of the key wrench into the socket when the piston has been moved into the socket by the pressure.

In a more elaborate embodiment, a second locking piston is slidingly mounted within the first piston. The second piston is operable to push a locking member to extend from the first piston into the cap body to lock the first piston extended into the socket. The operator will then be unable to force the key wrench into the socket The second piston is normally spring biased to an inactivated position. It is activated to restrain the first piston only if the pressure in the vessel is high enough, that is, well above a low level pressure which is sufficient for activating only the first piston to move into the socket.

Other objects, features and advantages of the present invention will become apparent from the following description of preferred embodiments thereof which are illustrated in the accompanying drawings.

BRIEF DESCRIPTION OF THE DRAWINGS

FIG. 1 is a vertical cross section through a first embodiment of the invention.

FIG. 2 shows the embodiment of FIG. 1 with the socket blocked by the piston.

FIG. 4 is a vertical cross section of a third embodiment of the invention, which includes a low pressure acting first piston and a higher pressure second piston.

FIG. 5 shows the embodiment of FIG. 4 in the activated state of the higher pressure second piston.

DETAILED DESCRIPTION OF PREFERRED EMBODIMENTS

Figure 6:
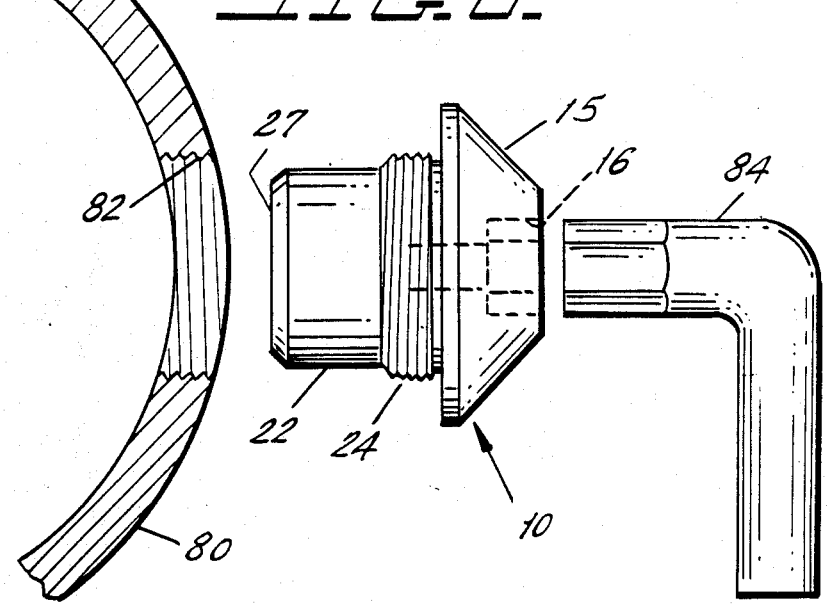
FIG. 6 shows a portion of a vessel to which the cap of the present invention is mounted and a cap removal tool for the cap.

The first embodiment of the cap of FIG. 1 includes a cap body 10 having a conical top portion 12 with a conically widened periphery 15 which resists the application of a pipe wrench thereto. The top portion terminates at its bottom in an annular flange 14. The top end 17 of the top portion is flat and has defined in it a socket 16. Socket 16 is shaped to receive an inserted cap turning means, e.g. a wrench like an Allen type hex key wrench 84 (FIG. 6). An annular channel 18 defined in flange 14 accommodates an O-ring 20 which is compressed against the vessel wall 80 (FIG. 6) surrounding the opening 82 that receives the cap when the cap is tightened.

A bottom portion 22 of the locking cap depends from its top portion 12. Its periphery includes a threaded collar 24 which enables the cap to be screwed into a threaded vessel opening 82 to be capped. The portion 22 has defined in it a hollow interior chamber 26 which is opened at the bottom 27 to be in pressure communication with the vessel.

Piston 28 is disposed to slide up and down within chamber 26 of cap 10. The piston includes a wide diameter portion 30 which has the shape of chamber 26. An annular groove 31 supports an O-ring 32 around the periphery of the piston portion 30 for sealingly engaging the chamber wall 33. The cap of the present invention is made leakproof since O-ring 20 prevents fluid flow around the cap while O-ring 32 prevents fluid escape around the piston. The piston portion 30 includes an end stop 34 for engaging the top shoulder 35 of chamber 26 to define the top of the piston path A key wrench insertion blocking rod 36 projects above end stop 34 into socket 16 when the piston has been raised.

In operation, the cap of the present invention is threaded into the vessel through its threaded opening 82. In response to even very low pressures within the vessel which exceed ambient pressure, piston 28 is forced upwardly by pressure below piston portion 30 and socket 16. The depth of penetration of piston 28 into socket 16 is limited by the size of end stop 34 which comes to rest against shoulder 35 in chamber 26. Consequently, an operator is inhibited from inserting his key wrench into the socket 16 to unscrew or remove cap 10. In the presence of low vessel pressure, the operator could still force the key wrench into the socket overcoming the pressure resistance. The area of the surface 29 of piston 28 which is exposed to the internal pressure in the vessel can advantageously be sized so that the force needed to insert the wrench varies based on the vessel internal pressure, according to the table below.

| PRESSURE IN VESSEL | FORCE NEEDED TO INSERT TOOL |
| --- | --- |
| 140 PSI | 208 lbs |
| 50 | 74 |
| 10 | 15 |
| 2 | 3 |

When the pressure in the vessel is at a low enough value, piston 28 is returned to its downward position of FIG. 1 merely with the force of a finger or a wrench inserted in the socket 16 which need overcome only the frictional resistance between O-ring 32 and the interior peripheral wall 33 in chamber 26.

FIG. 2 illustrates the cap 10 with its blocking rod 36 in the socket 16 for interfering with the insertion of tool 84 (FIG. 6) into cap 10.

Figure 3:
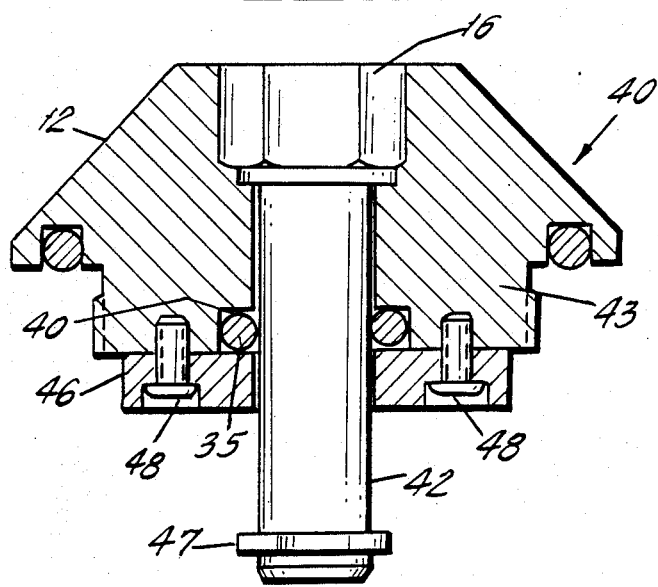
FIG. 3 is a vertical cross section through a second embodiment of the invention.

Cap 40 of FIG. 3 operates similarly to cap body 10 of FIG. 1. Piston 42 protrudes below cap body bottom portion 43 in the manner shown. O-ring 45 is housed in an annular groove 44 which is located in bottom portion 43, rather than in piston 42 as in Fig. 1. An annular retaining member 46 is secured to bottom portion 43 by screws 48 to keep O-ring 32 in groove 44 and to define that groove. At its lower end, piston 49 carries flange 47 which contacts retaining member 46 as the piston rises under the influence of pressure in the vessel, for setting the height of the piston into the socket 16. Preferably, piston 42 could be sized such that, at a tank pressure of 140 PSI, 27 lbs. of force are needed to push piston 42 down, out of socket 16.

The embodiment of FIG. 4 repeats the elements of FIG. 1, modified as follows. Piston 28 has a hollow interior chamber 81 defined by wall 49 which supports in the piston 28 a secondary piston 50. Piston 50 has a reduced cross-section neck 52 and a conically tapered shoulder 54 which widens into the full cross-section bottom portion 56. O-ring 55 located in annular groove 57 of piston portion 56 seals piston 50 inside piston chamber 81.

A spring 58 fits over neck 52 and presses on flange 53 around neck 52 and upon the top 51 of the chamber for piston 50 to urge secondary piston 50 downwardly with respect to top piece 12. A plurality of openings 59 are formed in the peripheral wall 60 of the main piston 28. These permit locking means 62, comprised, for example, of first and second balls 64 and 66, to move outward through openings 59 in response to the upward movement of secondary piston 50 past balls 64, 66. Annular recess 68, machined in the body of cap 12, receives locking means 62 and 66 when piston 50 has risen high enough, and the balls then lock main piston 28 in upraised position. The positions of main piston 28, secondary piston 50, balls 62, 66 in the upraised position of main piston 28 are illustrated in FIG. 5.

The cap of FIGS. 4 and 5 operates as follows. Even at relatively low vessel pressures, main piston 28 is driven up into socket 16 as described previously for FIG. 1. At lower pressure, this would inhibit insertion of key wrench 84. However, at relatively low vessel pressure the spring action of spring 58 keeps secondary piston 50 down inside piston 28 in the position illustrated in FIG. 4.

If the vessel pressure is sufficiently high against piston 50, the force of spring 58 is overcome and secondary piston 50 moves upwardly through the hollow 81 of piston 28 until the piston neck hits the chamber top wall 51. The balls 62 and 66 are raised up to the recess 68 by the piston 28. As secondary piston 50 rises while the balls 62 and 66 are being held at opening 59, balls 62 and 66 ride over the conically tapered shoulder 54 and are forced partially outside opening 59 and into recess 68. This locks main piston 28 in cap body 12 with its blocking rod 36 extending into the socket 16 which prevents the operator from forcefully inserting his key wrench 84 into the socket.

At a reduced vessel pressure, the force of spring 58 returns the secondary piston 50 to the position of FIG. 4. In this position of piston 50, there still may be a slight residual pressure in the tank. But, an operator is capable of pushing main piston 28 out of socket 16.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A pressure locking cap, comprising:
a cap body having a top portion with a top surface and having a bottom portion, the bottom portion being insertable into an opening in a vessel which may be pressurized;
a tool receiving socket defined in the top portion of the cap body extending inward from the top surface into the cap body, and the socket being shaped so that a tool inserted therein and operated therein may be used for removing the cap from the vessel;
a piston disposed in the cap body and including a side thereof opening into the interior of the vessel for being subjected to the pressure in the vessel and the piston including blocking means movable into the socket as the piston is moved through the cap body, the blocking means moving into the socket occupying part of the socket for blocking insertion of the tool into the socket.

2. The cap of claim 1, further comprising a piston chamber in the cap body defined by a wall, the piston being movable through the chamber, and a seal around the piston and between the piston and the wall of the chamber for maintaining pressure in the vessel and preventing pressure leakage past the piston.

3. The cap of claim 1, in which the top portion of the cap has a peripheral area with a contour shaped to resist application thereto of an alternative removing tool.

4. The cap of claim 3, in which the contour of the peripheral portion of the top of the cap is conically tapered wider down from the top surface of the cap.

5. The cap of claim 2, in which the top portion includes an annular flange for defining a shoulder which rests against the vessel around the opening in the vessel, and the bottom portion of the cap body being narrower than the annular flange for being inserted into the opening in the vessel while the annular flange shoulder rests upon the vessel around the opening thereinto.

6. The cap of claim 5, further comprising a seal on the shoulder for resting against the vessel for preventing fluid pressure leakage past the seal.

7. The cap of claim 1, wherein the bottom portion of the cap has a periphery which is screw threaded for being screw threadedly received in an opening in the vessel 8. The cap of claim 7, wherein the socket is shaped for receiving the tool therein, such that rotation of the tool when in the socket rotates the cap for screw removal of the cap from the opening in the vessel.

9. The cap of claim 1, wherein the bottom portion of the cap includes a hollow chamber therein of a relatively wider width and above the wider width chamber the chamber for the piston narrows to a narrower width, and a shoulder is defined between the wider and narrower width sections of the chamber in the cap; the piston having a greater width portion thereof which includes thereon the side thereof opening into the pressure in the vessel, and the wider portion of the piston contacting the shoulder in the chamber upon movement of the piston upwardly for blocking further movement of the piston upwardly and thereby setting the distance which the blocking means of the piston moves into the socket.

10. The cap of claim 1, further comprising first means on the piston for cooperating with other means on the cap body for establishing the maximum distance which the piston moves through the cap body and the blocking means of the piston moves into the socket under the influence of pressure in the vessel.

11. The cap of claim 1, wherein the blocking means of the piston comprises a rod.

12. The cap of claim 1, wherein the piston further includes a hollow piston receiving chamber within the piston; a second piston disposed in the hollow piston receiving chamber of the first mentioned piston; locking means in the first mentioned piston for being movable radially of the first mentioned piston for engaging between the first piston and the cap body for locking the first piston against motion through the cap body and to an inactivated position where the locking means are out of engagement with the cap body for enabling movement of the first piston through the cap body; and the second piston being movable through the chamber in the first piston for selectively moving the locking means to the activated position and the inactivated position; the second piston having a side thereof which opens to the vessel pressure, such that elevated pressure in the vessel tends to move the second piston toward the activated position.

13. The cap of claim 12, further comprising means resisting movement of the second piston from the inactivated toward the activated position thereof, said resisting means being of a strength such that elevated pressure in the vessel acting upon the second piston is sufficient to overcome the resisting means and enable the second piston to move toward the activated position thereof.

14. The cap of claim 13, wherein the locking means comprises a radially shiftable element supported in the first mentioned piston and comprises a locking means receiving chamber in the cap body positioned for receiving the locking means therein when the first piston is in an upraised position due to pressure in the vessel, the second piston being so shaped that upon elevated pressure in the vessel the second piston is moved to the activated position, the second piston is shaped to then press upon the locking means and to move the locking means into the locking means receiving chamber for locking the first piston in the upraised, tool insertion blocking position.

15. The cap of claim 14, wherein the second piston is shaped to comprise a more narrowed neck portion near the top thereof and a tapered shoulder portion which tapers wider toward the bottom of the second piston; with the locking means element resting against the neck portion, the locking means may be out of the locking means receiving chamber, and the shoulder portion of the second piston being tapered sufficiently wide that contact of the locking means element with the shoulder portion drives the locking means element radially outwardly and into the locking means receiving chamber in the cap body.

16. The cap of claim 13, wherein the resisting means comprises a spring in the piston receiving chamber of the first piston and acting upon the second piston for driving the second piston downwardly in opposition to the pressure exerted by the pressure in the vessel against the second piston.

17. The cap of claim 12, further comprising a seal in the second chamber for preventing leakage of fluid pressure past the second piston in the piston receiving chamber within the first piston.

18. The cap of claim 1, wherein the piston further includes a hollow piston receiving chamber within the piston; a second piston disposed in the hollow piston receiving chamber; locking means connectable between the first piston and the cap body and operable by the second piston between an inactivated position, when the vessel is not highly pressurized, wherein the second piston is positioned to prevent the locking means from locking between the first piston and the cap body, and an activated position, when the vessel is more highly pressurized, wherein the second piston is moved by pressure in the vessel to move the locking means to lock the first piston in an upraised position in the cap body where the first piston blocks insertion of a tool into the socket.

* * * * *